US006909992B2

(12) United States Patent
Ashley

(10) Patent No.: US 6,909,992 B2
(45) Date of Patent: Jun. 21, 2005

(54) AUTOMATICALLY IDENTIFYING REPLACEMENT TIMES FOR LIMITED LIFETIME COMPONENTS

(75) Inventor: Mark Ashley, Sydney (AU)

(73) Assignee: Sun Microsystems, Inc., Santa Clara, CA (US)

(*) Notice: Subject to any disclaimer, the term of this patent is extended or adjusted under 35 U.S.C. 154(b) by 75 days.

(21) Appl. No.: 10/288,682

(22) Filed: Nov. 5, 2002

(65) Prior Publication Data

US 2004/0088141 A1 May 6, 2004

(51) Int. Cl.$^7$ ............................................. G06F 17/60
(52) U.S. Cl. ........................ 702/184; 702/188; 702/186
(58) Field of Search ............................. 702/184, 122, 702/179, 181–183, 180, 185–188, 177, 63; 714/47, 40, 44, 46, 1, 37, 25; 709/220, 224; 377/1, 19, 20, 27; 707/2; 340/500, 540, 636.1, 3.1, 286.01, 815.4; 705/8, 9

(56) References Cited

U.S. PATENT DOCUMENTS

| | | | | |
|---|---|---|---|---|
| 5,689,416 A | * | 11/1997 | Shimizu et al. | 700/80 |
| 5,923,870 A | * | 7/1999 | Johns et al. | 713/502 |
| 5,926,777 A | * | 7/1999 | Vink et al. | 702/130 |
| 6,381,605 B1 | | 4/2002 | Kothuri et al. | 707/100 |
| 6,483,292 B2 | * | 11/2002 | Kochi | 324/158.1 |
| 6,484,128 B1 | * | 11/2002 | Sekiya et al. | 702/185 |
| 6,490,543 B1 | * | 12/2002 | Jaw | 702/184 |
| 6,556,926 B1 | * | 4/2003 | Haines | 702/34 |
| 6,684,180 B2 | * | 1/2004 | Edwards et al. | 702/184 |
| 6,738,748 B2 | * | 5/2004 | Wetzer | 705/9 |
| 2001/0034733 A1 | | 10/2001 | Prompt et al. | |
| 2001/0037227 A1 | | 11/2001 | McInnis et al. | 705/7 |
| 2002/0016757 A1 | | 2/2002 | Johnson et al. | |
| 2002/0161885 A1 | | 10/2002 | Childers et al. | |

FOREIGN PATENT DOCUMENTS

| | | |
|---|---|---|
| WO | 00/04456 | 1/2000 |
| WO | 02/33631 | 4/2002 |

OTHER PUBLICATIONS

U.S. Appl. No. 10/369,970 filed Feb. 19, 2003.*
"Class Timer," JAVA Platform Standard Edition V1.3, Online! Aug. 15, 2000, XP002289988, 4 pages (2 sided).
European Search Report for 03256991.5–2211–, mailed Sep. 16, 2004, 3 pages.
Eric M. Burke, "Java and XSLT," Sep. 2001, O'Reilly & Associates, XP002289467, 4 pages (2 sided).
Weiss, March Allen, "Data Structures and Algorithm Analysis in C++," Feb. 1999, Addison Wesley Longman, Inc., XP002289197, 3 pages (2 sided).

* cited by examiner

*Primary Examiner*—Hal D Wachsman
(74) *Attorney, Agent, or Firm*—Robert C. Kowert; Meyertons, Hood, Kivlin, Kowert & Goetzel, P.C.

(57) ABSTRACT

A count down monitor may be configured to automatically generate an alert that one or more limited lifetime components included in multiple computer systems are due for replacement. For example, a system and method that provides up-to-date system configuration data for the multiple computer systems may include and/or interact with one embodiment of a count down monitor. The count down monitor may be configured to automatically generate an alert to indicate one or more of the limited lifetime components are due for replacement. The alert may be visual. The count down monitor may be configured to generate various types of alerts.

34 Claims, 10 Drawing Sheets

AUTOMATICALLY IDENTIFYING REPLACEMENT TIMES FOR LIMITED LIFETIME COMPONENTS

BACKGROUND OF THE INVENTION

1. Field of the Invention

This invention relates to computer systems, and more particularly to automatically identifying replacement times of limited lifetime components.

2. Description of the Related Art

With the growing deployment of computer systems and software, users often expect systems to operate without system downtime. Suppliers of computer systems are pressured by customers to provide quick resolution of problems. For example, a particular device of a computer system provided by a supplier may fail, causing system downtime. The customer may pressure the supplier to quickly replace the device in order to minimize downtime. Service personnel, on-site field staff, field engineers, or other resources dedicated to servicing computer systems for customers must quickly identify and solve problems to ensure customer satisfaction.

Service personnel may confront several challenges when attempting to quickly resolve customer problems. Service personnel may need access to accurate data in order to actually solve the problem. For example, a storage device in a computer system may fail and although service staff knows the storage device must be replaced, the service staff may have limited information regarding the specific configuration of the system. Resolution of the problem may be delayed as the service staff obtains additional replacement information (e.g., type and part number) for the storage device. Furthermore, exact configuration information for a particular system may be outdated or may be difficult to access. Thus, resolution of the problem may be further delayed.

Some or all of the computer systems serviced by the service personnel may include limited lifetime components such as air filters and batteries. Limited lifetime components tend to stop operating correctly over a predetermined period of time (e.g., performance of the component may degrade over time). Service personnel may forget to replace some of the limited lifetime components. For example, service staff may overlook replacement of air filters because seemingly insignificant components such as air filters are typically excluded from on-going preventative maintenance plans. Problems with such components may be delayed or even avoided if the service personnel are aware that these components are due for replacement.

Downtime may actually increase when customer systems include limited lifetime components that are overlooked for replacement. Thus, it may be desirable to have a system automatically track when the limited lifetime components are due for replacement.

SUMMARY

A count down monitor may be configured to automatically generate an alert to users (e.g., service personnel) that one or more limited lifetime components (e.g., air filter, batteries) included in multiple computer systems are due for replacement. For example, a system that provides up-to-date system configuration data for multiple computer systems to service personnel may include and/or interact with one embodiment of a count down monitor. Limited lifetime information for the one or more limited lifetime components included in each of the multiple computer systems may be identified in the system configuration data. The count down monitor may be configured to automatically generate an alert to indicate one or more the limited lifetime components are due for replacement.

In one embodiment, the count down monitor may be configured to determine that one or more of the limited lifetime components are due for replacement by accessing a count down interval and an installation date timestamp of each component to identify if the count down interval has elapsed. The count down interval and installation date timestamp may be included in the limited lifetime information. The count down monitor may be configured to access the limited lifetime information at different intervals as indicated by an internal timer. The internal timer may specify the different intervals. A generated alert may be sent to an application when a count down interval elapses.

In one embodiment, the alert may be visual. The visual alert for each of the one or more limited lifetime components may be generated by highlighting an icon of each component in red. Blinking text may highlight each icon of a component. A fax and/or email may be sent to specified users to alert the users that one or more of the limited lifetime components are due for replacement. The alert may also be audio and may be a beeping sound broadcast over a speaker. The audio alert may be a voicemail to a phone and/or a page to a wireless device. The count down monitor may be configured to generate various types of alerts.

In some embodiments, the alert may be generated by automatically creating a service call in a call management system used by the service personnel. Each service call may be assigned a priority within the call management system (e.g., to allow service personnel to determine the order in which calls should be handled). The count down monitor may accordingly set the service call corresponding to the limited lifetime component at a specific priority. Typically, such service calls may have lower priorities than critical calls (e.g., calls generated due to actual component failures).

In one embodiment, the count down monitor may be configured to stop generating the alert for a limited period of time while waiting for notification that the one or more components have been replaced. The notification may comprise receipt of a part order number associated with a replacement component for each of the one or more of the components. In one embodiment, the count down monitor may be configured to automatically reset the count down interval associated with a limited lifetime component when the notification of replacement is received.

Figure 1:
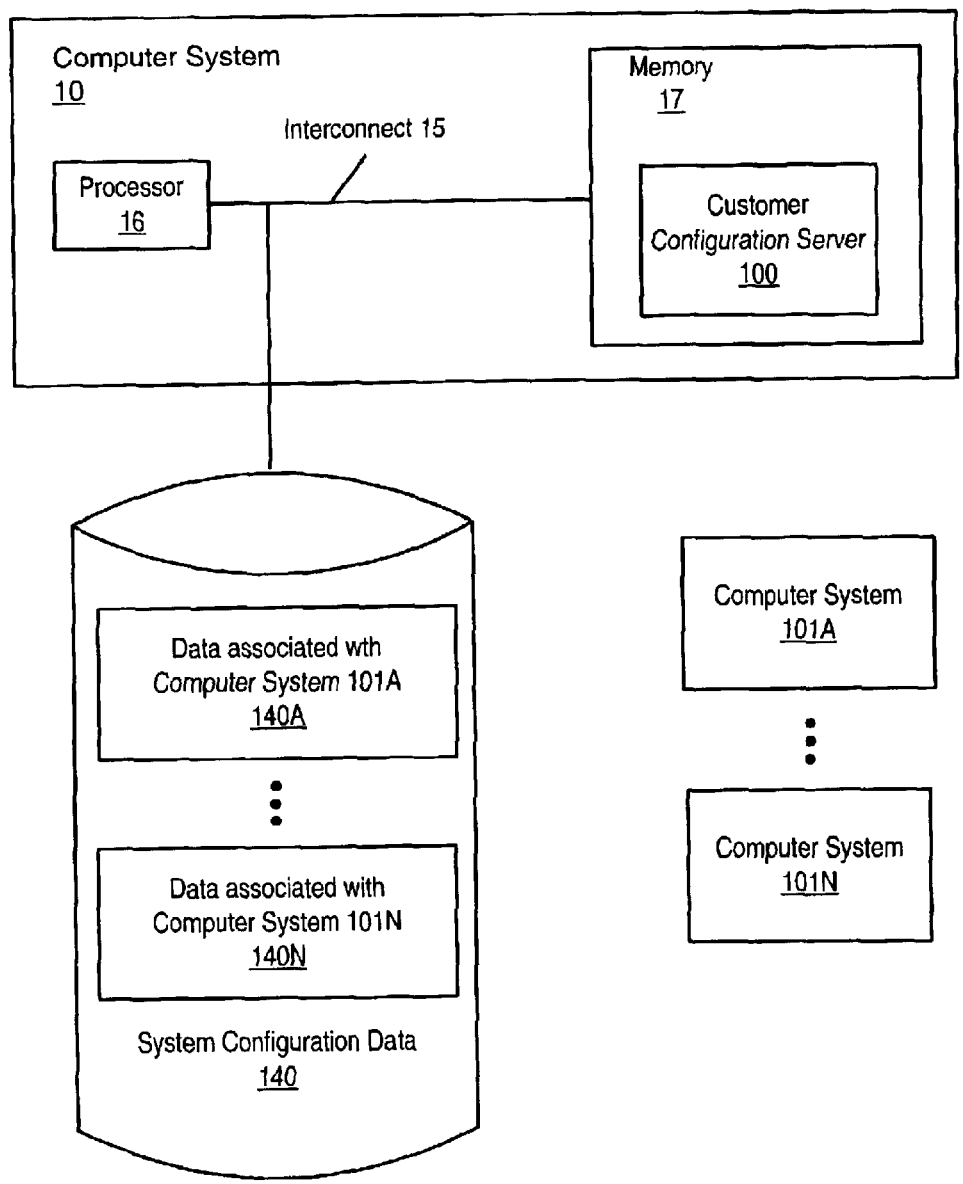
FIG. 1 illustrates a computer system suitable for implementing various embodiments of a customer configuration server.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

FIG. 1 shows a computer system 10 that is suitable for implementing various embodiments of a customer configuration server 100 that may provide up-to-date system configuration data 140 for multiple computer systems 101 to service personnel. System configuration data 140 may include data 140A–140N for multiple customers' computer systems 101A–101N, and thus customer configuration server 100 may provide service personnel with a single interface to data 140 representing many of the service personnel's customers' computer systems 101. Customer configuration server 100 may organize system configuration data 140 according to a hierarchy of logical groups within system configuration data 140. Some of those logical groups may group the portions 140N of system configuration data 140 that correspond to a particular computer system 101N together. Customer configuration server 100 may provide access to and/or process system configuration data based on the organizational hierarchy. Note that throughout this disclosure, drawing features identified by the same numbers followed by unique letters (e.g., computer systems 10A and 101N) may collectively be referred to by the number alone (e.g., computer systems 101).

Computer systems 101 may include various types of computing devices. For example, computer systems 101 may include servers, storage systems, network switches and/or routers, or any other type of computing device that includes a processor and a memory.

Computer system 10 may include components such as memory 17, a central processing unit (CPU) or processor 16, an input/output (I/O) interface, and device interconnect 15. Interconnect 15 is relied upon to communicate data from one component to another. For example, interconnect 15 may be a point-to-point interconnect, a shared bus, a combination of point-to-point interconnects and one or more buses, and/or a bus hierarchy including a system bus, processor bus, memory bus and I/O buses such as a peripheral component interconnect (PCI) bus. Memory 17 may store program instructions accessed by the processor 16. Instructions and data implementing a customer configuration server 100 may be stored in memory 17. An operating system may also be stored in memory 17.

Computer system 10 may further include other software and hardware components such as an input/output (I/O) interface that may be coupled to various other components and memory 17. For example, the computer system may be coupled to a network through a network interface that provides access to a plurality of network-attached devices. Computer system 10 may also include video monitors or other displays, track balls, mice, keyboards, local storage devices (hard drives, optical storage devices, etc.), local printers, plotters, scanners, or other computer peripheral devices for use with a computer system 10.

In different embodiments, the computer system 10 may take various forms, including a personal computer system, desktop computer, notebook computer, workstation, server, mainframe computer system, network appliance, network computer, Internet appliance, personal digital assistant (PDA), embedded device, smart phone, television system, or combinations thereof. In general, the term computer system may be broadly defined to encompass any device having a processor that executes instructions from a computer accessible medium such as memory 17.

A customer configuration server 100 may provide a front-end to system configuration data 140, allowing service personnel to search, view, and/or process selected portions of the system configuration data 140. Service personnel may use the system configuration data 140 to service both software and hardware components of the computer systems 101. Service may include repair, addition, removal and/or replacement of components.

Some service personnel may be employed by the supplier that provided the computer systems 101 to various customers. These service personnel (e.g., field service technicians and on-site service providers) may provide ongoing maintenance and support for customers' computer systems 101. Other service personnel may be employees of a customer (e.g., a customer's employee may access the system configuration data 140 to obtain a report on current configuration data for a particular one of that customer's computer systems). Both supplier service personnel and customer service personnel may access system configuration data 140 via customer configuration server 100 in some situations. In other implementations, access to system configuration data 140 may be restricted to a supplier's service personnel.

System configuration data 140 includes configuration information for several different computer systems 101A and 101B. Each computer system's configuration information 140A and 140B may include one or more objects (e.g., files, documents and/or database records). Various types of data may be included within each computer system's configuration information. For example, the configuration information for one computer system may include digital photos of the physical layout of components within that computer system, data files listing the hardware and/or software components included in that computer system, database records indicating the service history for one or more components included in that computer system, text documents that include customer contact information for that computer system, files identifying service personnel assigned to that computer system, etc.

Note that system configuration data 140 is a logical representation of the system configuration data that is accessible to customer configuration server 100. System configuration data 140 may be stored in various physical storage locations. In some embodiments, system configuration data 140 may be stored on a storage device (e.g., a disk drive) included in computer system 10. In another embodiment, system configuration data 140 may be stored on a dedicated file server coupled to computer system 10. System configuration data 140 may also be stored in a storage system (e.g., a RAID system) that is coupled to computer system 10 by a network. In other embodiments, system configuration data may be distributed among several storage devices and/or computer systems.

In some embodiments, portions of system configuration data 140 may be stored in one or more databases, which may each be maintained by a different database management system. For example, some system configuration data 140 may be included in a service history database that stores information about field replaceable units (FRUs) that the service personnel have serviced. This database may include information such as the FRU ID, FRU age and/or installation data, customer ID, computer system ID, service date, the name or ID of the service person(s) who serviced the field replaceable unit, and/or a description of the problems found during servicing. Another database may store inventory data (e.g., replacement part name, part number and version for a particular system configuration) identifying replacement parts that may be needed for various computer system configurations. Some system configuration data 140 may also be included within a manufacturing and/or sales database indicating what parts have been provided to each customer and/or which computer systems in which those parts were intended to be included.

In some embodiments, customer configuration server 100 may access portions of system configuration data 140 by querying the appropriate databases. For example, in many embodiments, customer configuration server 100 may be configured to query one or more databases for system configuration data 140 corresponding to a particular computer system 101 in response to receiving a service personnel request for access to system configuration data 140 that corresponds to that computer system 101. Customer configuration server 100 may provide data access services for accessing various types of databases, e.g. through directly supporting programs that include and/or interface to proprietary databases, such as SAP, Lotus Notes, CICS, etc., or through standardized interfaces, such as ODBC, JDBC, etc.

Customer configuration server 100 may also provide services for accessing network directories, such as directories that support the standard Lightweight Directory Access Protocol (LDAP) in some embodiments. Thus, customer configuration server 100 may provide real-time access to multiple disparate data sources of system configuration data 140. Furthermore, as new data sources (e.g., new databases) for configuration information become available, customer configuration server 100 may be updated to provide services for accessing the new data sources.

Customer configuration server 100 may track the physical location of various objects included in system configuration, data 140. For example, customer configuration server 100 may build an index that tracks the physical location of various objects (or groups of objects). As used herein, an "object" may include one or more files, object oriented programming objects, database records, or other data structures. In some embodiments, an index may track which software application manages access to various portions of system configuration data 140. In some embodiments, the organization of entries within the index may reflect how the objects included in system configuration data 140 are organized within an organizational hierarchy. In other embodiments, each index entry may explicitly indicate where an object is organized within the hierarchy of data.

Figure 2:
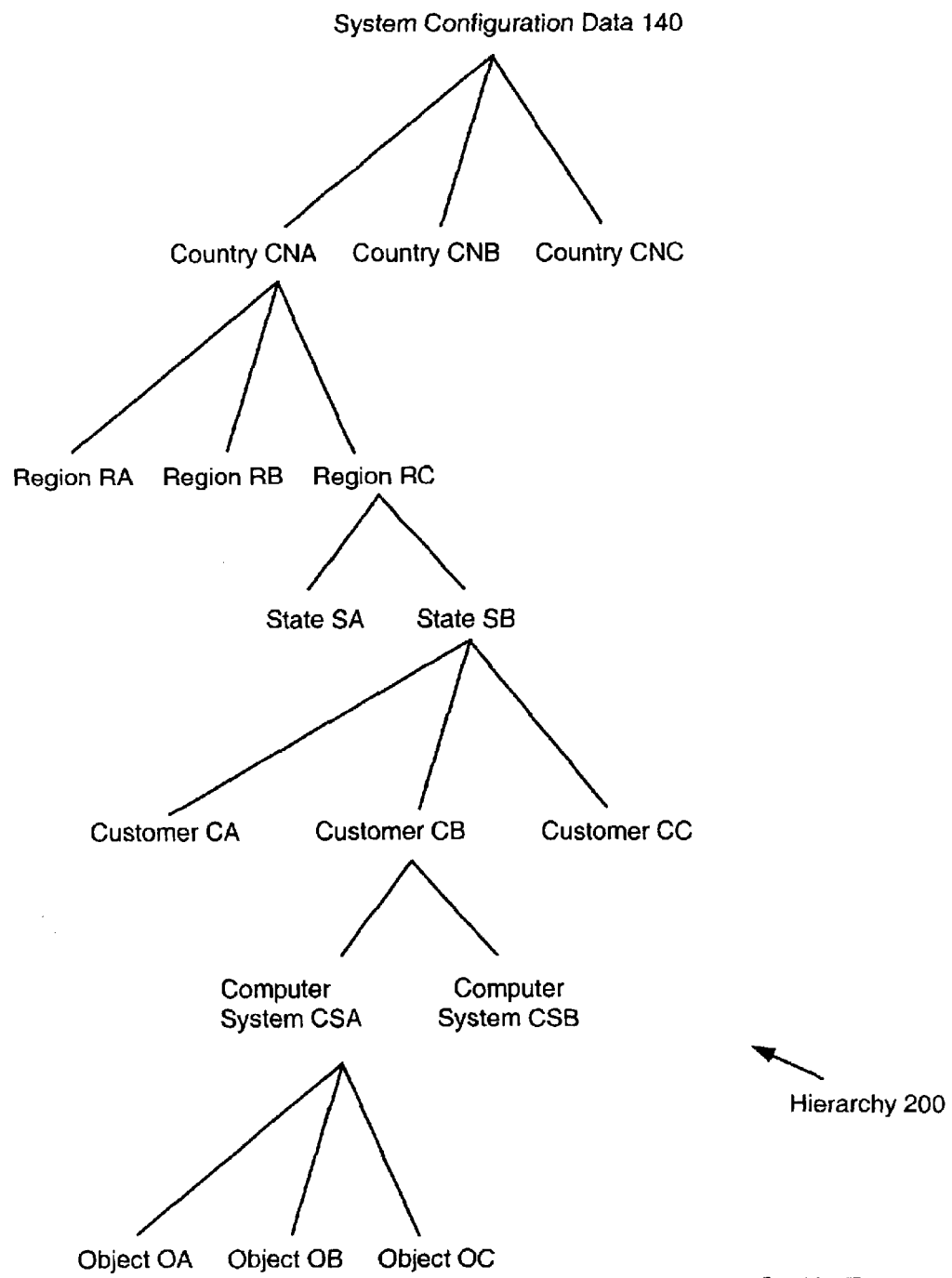
FIG. 2 illustrates an organizational hierarchy that a customer configuration server may use to organize system configuration data, according to one embodiment.

Customer configuration server 100 may organize system configuration data 140 according to a hierarchy that logically groups related portions of system configuration data 140. FIG. 2 illustrates a hierarchy 200 that customer configuration server 100 may use to organize files within system configuration data 140. At a low level of the hierarchy, customer configuration server 100 may group objects OA–OC for an individual computer system CSA together within the hierarchy. Files for several computer systems CSA–CSC may then be grouped together, for example, by customer CB. Note that in some embodiments, computer systems may be grouped together by divisions within a company before being grouped together by customers.

Objects representing several different customers CA–CC's computer systems may be grouped together according to the geographical state SB in which those customers' computer systems are located. Similarly, objects representing several states SA–SB's computer systems may be organized by the geographical region RC in which those states are located. Regions RA–RC may be grouped according to the country CNA in which those regions are located. Note that other objects may be included within several of the other groupings (e.g., CNB, CNC, RA, RB, SA, CA, CC, and CSB) but are not illustrated for clarity.

The hierarchy illustrated in FIG. 2 is merely exemplary. Some embodiments may use additional object groupings so that the system configuration data 140 is subdivided into a desired number of groups at each level of the hierarchy 200. For example, customers may be further (or alternatively) grouped by type of industry or by the city in which their headquarters are located (e.g., if the number of customers per state becomes undesirably large).

System configuration data 140 may be stored in various data sources. For example, some of system configuration data 140 may be stored as flat files included within a directory tree. Directories of these files may be organized according to the hierarchy 200 maintained by customer configuration server 100. For example, country directories may be created for each country, customer directories may be created within a country directory for each customer based in that country, and computer system directories may be created within a customer directory for each individual computer system owned by that customer. Other directories may be created within each computer system directory (e.g., in order to group different types of data that is available for each individual computer system).

System configuration data 140 may be provided in various ways to customer configuration server 100 for organization within hierarchy 200. For example, system configuration data 140 may be uploaded (e.g., via HTTP), emailed, downloaded from one or more databases, or transferred or copied between instances of customer configuration server 100. For example, customer configuration server 100 may be configured to receive uploaded data entered by service personnel performing a field service call (e.g., the service person(s) may enter system configuration data 140 into a wireless appliance and upload the data to customer configuration server 100).

Figure 3:
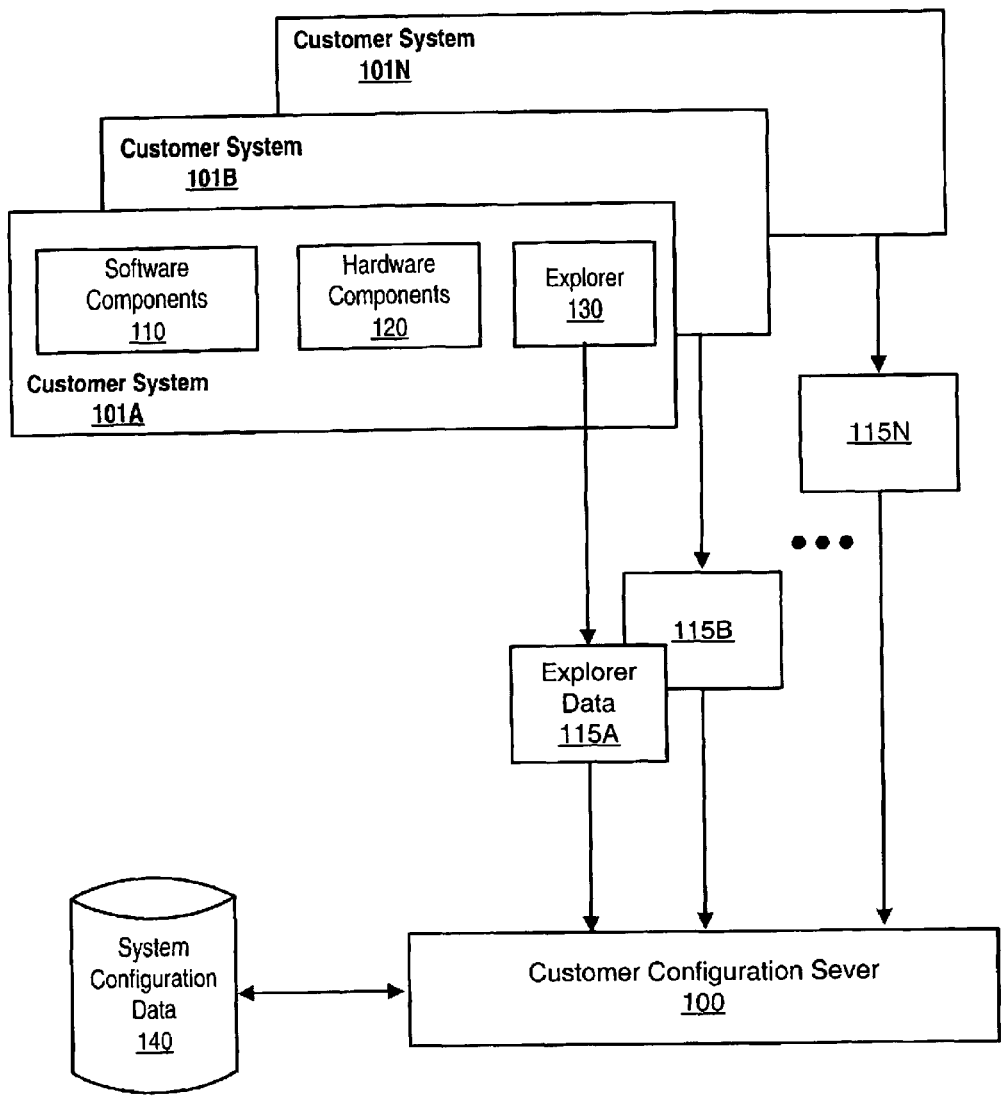
FIG. 3 illustrates one embodiment of a customer configuration server that may receive explorer data output from an explorer mechanism on each of several computer systems.

Customer configuration server 100 may also receive system configuration data generated by an explorer mechanism operating on a customers' computer system. FIG. 3 illustrates one embodiment of a customer configuration server 100 that receives explorer data sets 115A–115N. Note that each data set 115 may be received at a different time and via a different delivery method. Each set of explorer data 115A–115N describes a particular computer system 101A–101N. Explorer mechanisms 130 executing on multiple computer systems 101A through 101N may each output explorer data 115A through 115N.

Computer systems 101A through 101N may each include at least one processor that executes instructions from a computer accessible medium. Each computer system 101 may include various types of software components 110 and hardware components 120. For example, software components 110 may include an operating system (OS), OS patches, OS shared system libraries, device drivers, applications, etc. Hardware components 120 may include processors, memory, disk drives, system controllers, system cables, storage connection switches, etc.

Computer systems 101 may be physically distributed throughout numerous geographical locations (e.g., each computer system 101 may be located in a different building, city, state, country, etc.). Each computer system 101 may include software components 110 and hardware components 120. Some computer systems 101 may belong to different customers. Other computer systems 101 may be owned by the same customer (e.g., different computer systems may be used within different divisions of the same company).

An explorer 130 may execute on each computer system 101. An explorer 130 may be configured to collect explorer data 115 for the computer system 101A executing that explorer in some embodiments. In other embodiments, an explorer 130 may execute on one system 101A and collect explorer data 115N for another system 101N. The explorer 130 may be configured to output a set of explorer data that includes information about the hardware components 120 and/or software components 110 included in a particular computer system 101. Note that explorer data 115 from any number of computer systems 101 may be provided to the customer configuration server 100. Each set of explorer data may include one or more objects.

An explorer 130 may generate multiple sets of explorer data for the same computer system 101. For example, an explorer may be configured to periodically (e.g., weekly or monthly) perform system discovery to identify which hardware components 120 and/or software components 130 are included in a particular computer system. An explorer may also be configured to be initiated at any time by a customer or service person. In embodiments where multiple explorer data sets 115 may exist for a single computer system 101, each explorer data set may include information identifying the time at which that explorer data set 115 was created or provided to customer configuration server 100 (e.g., each explorer data object's name may indicate the date on which that explorer data object was created). Alternatively, customer configuration server 100 may timestamp each explorer data set 115 upon receipt.

Each explorer data set 115 may include information identifying software and/or hardware components that are currently (e.g., as of the time the explorer 130 executed) installed in a particular computer system 100. For example, explorer data 115A may, among other things, identify an OS patch version and/or type of disk drive currently in use or installed within a computer system 101A. The information may identify each component by name, type, version number, and/or other identifying indicia. The components identified within each explorer data set 115 for a particular computer system 101 may vary as components within that computer system are added, upgraded, and/or replaced.

When customer configuration server 100 receives explorer data 115, the customer configuration server may organize the explorer data within the hierarchy and store the explorer data to an appropriate storage location. Customer configuration server 100 may store the explorer data within a database or directory and/or update an index to reflect the physical location in which the explorer data is stored. In some embodiments, customer configuration server 100 may be configured to initiate one or more automated tasks upon receiving a set of explorer data. For example, the customer configuration server 100 may automatically compare the set of explorer data to a previously received set of explorer data for the same computer system 101 to determine whether any components have been added and/or removed from that computer system. Customer configuration server 100 may also automatically call an application to analyze the explorer data set (e.g., to locate potential configuration problems within the sending computer system 101).

In some embodiments, customer configuration server 100 may be configured to provide explorer 130 to customer computer systems 101. For example, a customer may send an email to an email address associated with customer configuration server 100 and, in response, customer configuration server 100 may automatically email explorer 130 to the requesting customer. Customer configuration server 100 may, in some embodiments, be configured to analyze each received explorer data set 115 to determine which version of an explorer application was used to create that data set. If the version is not the most recent version of the explorer application, customer configuration server 100 may automatically send an updated version of the explorer application to the computer system 101 that provided that explorer data set.

Figure 4:
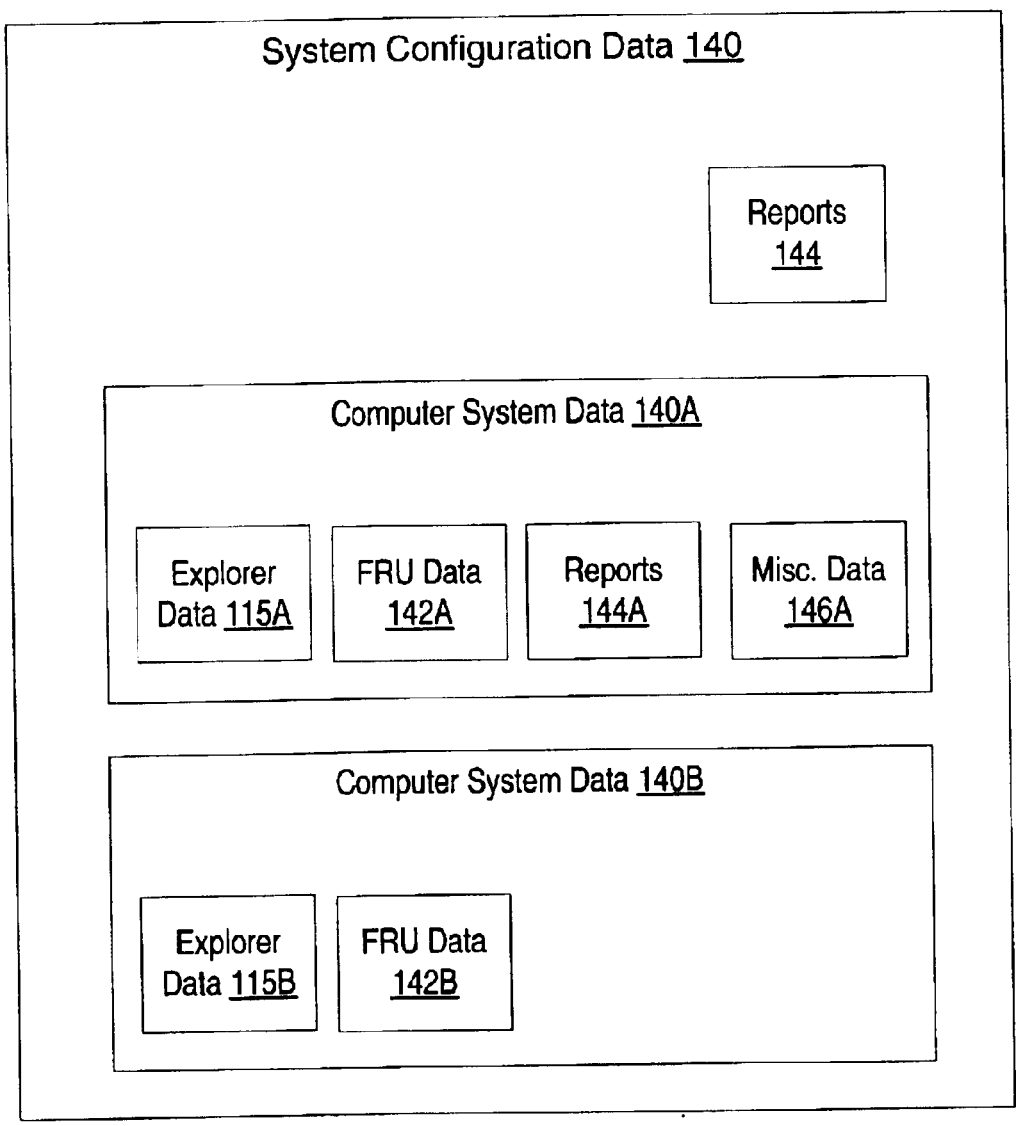
FIG. 4 illustrates system configuration data that may be maintained by a customer configuration server, according to one embodiment.

FIG. 4 illustrates different types of information that may be included within system configuration data 140 for each customer computer system 101. In FIG. 4, system configuration data 140 is illustrated as including data for two computer systems, data 140A and 140B, as well as one or more general reports 144. The customer configuration server may generate general reports 144 by processing (or by calling another application to process) data included in both computer system data 140A and computer system data 140B. Different types of system configuration data may be available for different computer systems 101. Note that this illustration is merely exemplary and that other embodiments may include data for substantially larger numbers of computer systems 101.

System configuration data 140A and 140B for a particular computer system may include explorer data 115 generated by an explorer mechanism, FRU (field replaceable unit) information 142 identifying the FRUs included in that computer system, reports 144, and/or miscellaneous data 146. Within each subset of the explorer data 140A for a particular computer system 101A, there may be several versions of a particular type of data. For example, if explorer data 115A is sent to customer configuration server 100 on a weekly basis, there may be multiple versions of explorer data 115A included in system configuration data 140A. Similarly, there may be a several sets of FRU information 142A (e.g., customer configuration server 100 may automatically generate a set of FRU information from each set of explorer data 115A).

As described above, explorer data 115 may include information about the hardware and software components included in a particular computer system. FRU information 142 may include information identifying each FRU within the system (e.g., by part number, revision, slot in which that FRU is installed, installation data, etc.). FRU information 142 may be generated from explorer data 115 (e.g., by using a tool provided via the customer configuration server 100, as will be described in more detail below). FRU information 142 may also be gathered from a manufacturing database or a field service database (e.g., a database identifying the service history of particular FRUs). Service personnel may also manually enter FRU information for a particular type of FRU and/or customer computer system. Customer configuration server 100 may organize the entered information within the organizational hierarchy (e.g., by updating the FRU information already stored for one or more customer computer systems, by creating a file within an appropriate directory, or by adding a reference to the entered FRU information at one or more places in an index).

Reports 144 may include report objects generated by executing one or more tools provided via the customer configuration server 100 on explorer data 115A and/or FRU information, as will be described in more detail below. Miscellaneous data 146A may include various other types of objects that relate to that particular computer system. For example, a service person may upload images showing the physical layout of FRUs within the system. Similarly, a sales or service person may enter customer contact information for each system. Another example of miscellaneous data 146 is information identifying which service person(s) are assigned to a particular computer system, customer, region, etc. The miscellaneous data may be identified (e.g., by selecting a particular computer system when uploading the data or by giving the data a particular object name) as corresponding to a particular computer system, and the customer configuration server 100 may use this identifying information to appropriately organize this data within system configuration data 140.

Figure 5:
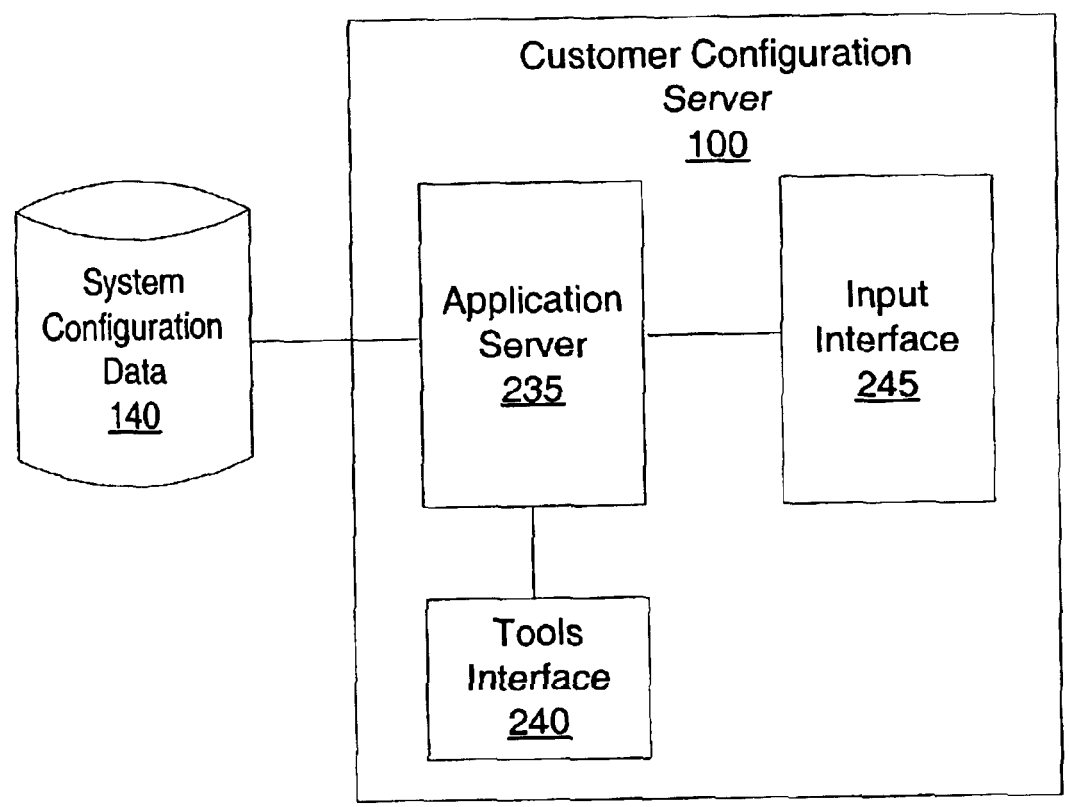
FIG. 5 illustrates one embodiment of a customer configuration server that includes an application server, a tools interface and an input interface.

FIG. 5 illustrates one embodiment of a customer configuration server 100. In this embodiment, customer configuration server 100 includes an application server 235, a tools interface 240, and input interface 245. Input interface 245 allows various applications and service personnel to request access to system configuration data 140. In many embodiments, service personnel may interact with customer configuration server 100 via a web browser on a local computer system. Thus, input interface 245 may be configured to interact with various web applications in order to provide information to and receive information from service personnel. Tools interface 240 may allow customer configuration server 100 to request that external applications, or tools, perform selected operations on system configuration data 140 (e.g., to create one or more reports 144).

Note that in many embodiments, application server 235 may include and/or communicate with a web server (not shown). Alternatively, customer configuration server 100 may include a web server instead of an application server. The application server 235 may be responsible for deploying and running various business logic layer applications (via tools interface 240) and for interacting with and integrating various enterprise-wide resources, such as web servers and databases. Application server 235 may provide a database service for applications (e.g., tools called by the application server) to utilize as an interface between the application and the database, providing a level of abstraction between the application and the particular type(s) of databases accessed by the application. Application server 235 may maintain the organizational hierarchy 200 by providing application services for indexing and/or searching various groups of objects (e.g., located within various directories and/or databases). An application server 235 may be configured to provide services to software executing on different computer systems than the application server 235.

Application server 235 may also provide application security services or components. For example, different service personnel may have different access privileges to system configuration data 140 (e.g., regional personnel may only have access to system configuration data 140 associated with their region). Similarly, customers may be allowed to view system configuration data for their computer systems but may not be allowed to view system configuration data for other customers' computer systems. Such security features may be associated with organizational levels within the hierarchy 200 maintained by customer configuration server 100. Web application security may be considered at different levels, such as: client-to-server communication, application-level privileges, database access, directory service access, etc. Application server 235 may include security-related services/components that provide support for performing user authentication, performing data encryption, communicating via secure protocols such as Secure Sockets Layer (SSL), utilizing security certificates, programming user access rights, integrating with operating system security, etc.

Application server 235 may also provide services enabling a web application to easily maintain user state information during a user session or across user sessions. Application server 235 may also support caching the results of application logic execution or caching the results of web page/component output, so that for appropriate subsequent requests, the results may be reused. Application server 235 may support result streaming, such as dynamically streaming HTTP output, which may be especially useful for large result sets involving lengthy queries. A related service may enable an application to easily display a large result set by breaking the result set down into smaller groups and displaying these groups to the user one at a time.

Application server 235 may also provide support for managing various types of complex, multi-step transactions performed by many web applications. For example, this support may be provided via a software component model supported by the application server, such as the Enterprise JavaBeans™ component model, or via integration with third-party transaction process monitors, etc. It is often desirable to enable web applications to perform certain operations independently, as opposed to in response to a user request. For example, it may be desirable to automatically send a newsletter to customers and/or service personnel via email at regularly scheduled intervals. Such a newsletter may indicate the availability of an upgraded version of an explorer application, new tools and/or data sources accessible via the customer configuration application 100, etc. Application server 235 may support the creation and scheduling of events to perform various types of operations. For example, application server 235 may be configured to periodically email reminders to service personnel. Similarly, application server 235 may be configured to periodically perform certain functions on and/or call certain tools to operate on system configuration data 140 included in particular portions of the hierarchy 200. Application server 235 may also support triggered events such as automatically generating a report 144 in response to receiving explorer data 114 and/or automatically emailing service personnel if certain conditions arise (e.g., if performance of a function on system configuration data 140 identifies that a threshold number of failures have occurred for a particular component, service personnel responsible for computer systems 101 that include that component may be emailed the report). Web applications may utilize various types of standard network application services, such as an email service, FTP service, etc. Application server 235 may provide these types of services and may enable applications to easily integrate with the services.

Requests for access to system configuration data 140 may be received via input interface 245. Requests may be received directly (e.g., via a command-line interface) or indirectly (e.g., from a web server client). The input interface 245 may include a graphical and/or command line user interface for providing a display and/or interactive access to service personnel.

Input interface 245 may facilitate display of one or more menus (e.g., via a web browser). The menus may allow a service person to "drill down" to desired data within the organizational hierarchy 200 by navigating through the organizational levels included in the hierarchy (e.g., by selecting a county CN, then a region R, then a state S, then a customer C, then a computer system CS, etc.). Thus, the menu may include selections that correspond to data available at a particular level of the organizational hierarchy 200 of system configuration data 140. For example, a default menu may identify various countries for which system configuration data 140 is available (e.g., by displaying a clickable image map or by displaying a list of country names). The menu options may correspond to groups of data or to individual objects available at a selected level of the hierarchy 200 (e.g., one computer system level menu option may identify a report object for a selected computer system, while another may identify a group of explorer data sets for that computer system).

If a particular section of the hierarchy 200 is selected (e.g., by typing in a particular country name or clicking a particular country within an image map), the input interface may facilitate display of additional menus. These menus may also correspond to the organizational hierarchy 200. For example, if a particular customer is selected, a list of that customer's computer systems may be displayed. If a particular computer system is selected, a list of the data (e.g., FRU information, explorer data, miscellaneous data, and/or reports) available for that computer system may be displayed. If miscellaneous data is selected, the display may list the objects included in that computer system's miscellaneous data. Selection of a particular object may cause that object to be downloaded to the service person's local computer and/or displayed via a web browser.

In some embodiments, input interface 245 may support a graphical user interface. For example, if a service person "drills down" or searches for a particular computer system, a graphical representation of the hardware and/or software included in that computer system (e.g., as identified within the most recently received explorer data set for that computer system) may be displayed to a user. For example, this user interface may show a part name and number for each component and/or specific icons or other indicia associated with each unique component. Some component names may be highlighted in red to indicate that the named components are hardware components. In many embodiments, options corresponding to data objects associated with individual components may be displayed in response to selection of the component name or icon in a FRU list. For example, selection of a particular storage device may result in the display of additional options corresponding to that storage device's service history.

Options to select various functions and/or tools may be provided via input interface 245. For example, a web page may include a search box that allows service personnel to search configuration data 140 for various information (e.g., to search for computer systems included in a particular country, to search for which computer systems currently include a particular type of FRU, etc.). Results of the search may then be displayed. In embodiments where service personnel access customer configuration server 100 via a web browser, different options may be presented depending on the type of information currently being viewed. For example, if data associated with a particular portion of the hierarchy 200 is being viewed (e.g., a list of customers within a country), the options displayed may correspond to functions and tools that can operate on all of the data included in that portion of the hierarchy. For example, if a service person is viewing a list of computer systems owned by a particular customer, functions and tools capable of operation on data for multiple computer systems may be displayed. Similarly, if a service person is viewing a list of explorer data sets 115 available for a particular computer system, the display may include options to select functions and tools that operate on one or more sets of explorer data. The display may also include an option to select which portions of system configuration data 140 the function or tool should operate on. Some tools and/or functions may be selected to generate reports 144 from all or part of system configuration data 140.

Input interface 245 may also facilitate display of a current operation being performed (e.g., via a graphical status bar indicating how much of the operation has been performed) in response to selection of a particular tool or function for execution. For example, if a tool was selected to build a particular report 144, the display may include a graphical representation of the percentage of the report build that has completed.

Application server 235 may be configured to respond to specific requests received via user interfaces 245 by performing various operations and/or calling one or more tools via tools interface 240. For example, application server 235 may receive a request for the identities of computer systems 101 included in a specific geographic location. In response, application server 235 may search system configuration data 140 (e.g., by navigating a directory tree organized according to the organizational hierarchy or an index of values which point to the targeted information's location) for the requested information and provide the information to the requesting application. In many embodiments, application server 235 may fulfill a request initiated by a service person by displaying the requested data via a Web browser.

Functions performed by the application server 235 may include searching, reading, and outputting (e.g., for display via a web browser) system configuration data 140. Application server 235 may also be configured to update, create, delete, and reorganize system configuration data 140 (e.g., system configuration data 140 may be reorganized in response to one customer acquiring computer systems that formerly belonged to another customer). For example, the application server 235 may create a directory for a new customer in response to a request from service personnel or in response to receiving explorer data corresponding to a customer for which no system configuration data 140 is currently maintained. Another function may involve transfer data between instances of customer configuration server 100. Such a function may involve transferring various types of objects using various transfer protocols. The portions of system configuration data 140 on which data access functions should be performed may be selected by a user and may correspond to the organizational hierarchy. For example, a function may be performed on all computer system data maintained for a particular customer, or for all customer data maintained for a particular country. Application server 235 may also include scripts that perform utility functions such as managing the operations of other scripts that access system configuration data 140.

Application server 235 may be configured to perform one or more database accesses in response to certain requests received via input interface 245. For example, if a service person drills down to a particular computer system, menu options corresponding to each component included in that computer system may be displayed. If the service person selects a particular component, application server 235 may query one or more databases for system configuration data corresponding to that component and display the returned data (if any) to the service person. For example, the application server 235 may query a service database for that component's service history.

Another function that may be performed by customer configuration server 100 (or, in some embodiments, by a tool accessible to customer configuration server 100) may involve analyzing the system configuration data 140, extracting potentially useful information based on the analysis, and storing the extracted information in a report. Service personnel viewing the report may decide to proactively upgrade, service, and/or replace various components if the information identifies certain components as being likely to fail (e.g., because those components are outdated, have poor service history, etc.). For example, customer configuration server 100 may analyze data included in a service history database in order to generate reports indicating the percentage failure for each type of component. Customer configuration server 100 may also be configured to identify which computer systems 101 currently include each type of component in such reports. Customer configuration server 100 may further analyze system configuration data 140 to generate reports indicating, for example, whether certain components fail more often when used in conjunction with other components. In some embodiments, the customer configuration server 100 may be configured to perform data mining in order to discover previously unknown relationships among the data (e.g., facts) that may be helpful to users. These facts may be stored as a report 144 for one or more computer systems within system configuration data 140. For example, an exemplary discovered fact may be recorded in a report as: "If PART=disk then FAULTY=high, Confidence 90% supported by 900,000 rows." In this example, the discovered fact indicates that a particular disk drive used by different customers in different geographical locations is faulty. A confidence of ninety percent may be supported by 900,000 rows (e.g., database records) analyzed within the system configuration data 140. After reviewing such a report, service personnel may, for example, decide to proactively replace the disk drives before the same disk drive used by various customers fail.

Other functions performed by application server 235 may include automated tasks that are performed in response to service personnel-specified triggers. For example, service personnel may request that certain functions or tools be performed on a set of explorer data as soon as that set of explorer data is received from a customer. These automated tasks may be performed one or more times in response to various triggers. Triggers may be periodic. For example, one automated task may be performed on a weekly basis (e.g., each Tuesday at midnight). A service person may select an automated task, the data on which the automated task is to be performed, and/or the triggers associated with that automated task via input interface 245. Automated tasks may include performance of various functions and/or calling various tools to operate on system configuration data included in selected portions of the hierarchy 200. For example, automated tasks may include comparing different versions of explorer data sets 115 for a particular computer system 101 in response to receiving a new explorer data set, analyzing a newly receiving explorer data set for potential configuration problems, or emailing service personnel in response to identifying potential configuration problems in one or more computer systems 101. Other automated tasks may include periodically deleting old data (e.g., removing explorer data sets more than six months old) from system configuration data 140 and periodically generating reports from system configuration data 140.

In embodiments where the system configuration data 140 is stored in a directory tree that reflects the organizational hierarchy 200 maintained by the customer configuration server 100, data may already be aggregated into the logical groupings on which functions are typically performed. In such embodiments, each directory may include a special object (e.g., a file) that identifies (e.g., by identifying that level of the hierarchy at which that directory resides) which type of directory that directory is. For example, a special file type may identify a multi-country directory, a country directory, a region directory, etc. These files may be created either manually by service personnel or automatically by the customer configuration server 100 (e.g., when creating the directory itself). Scripts included in the customer configuration server 100 may use these files when performing functions such as navigating the directory tree and displaying information.

Application server 235 may be configured to support a specific protocol for server communication. The specific protocol may enable communication via server commands (e.g., customer configuration server 100 may be configured to respond to server commands generated by performing various functions and/or calling one or more tools). Server commands may be received from service personnel (e.g., via an operating system (OS) command line interface) or from another application configured to execute server commands. For example, one server command may be used to request inode characteristics about the system configuration data objects stored in the physical computer system 10. Application server 235 may be configured to determine whether a server command should be handled by that instance of the customer configuration server and, if not, to forward the server command to the appropriate instance of the customer configuration server. For example, if a server command requests access to system configuration data in a particular section of the hierarchy, and the receiving application server does not manage data included in that section, the application server may forward the server command. Similarly, some server commands may be forwarded between instances of customer configuration server 100 so that an instance executing on a physical computer system located closer to the requester handles the request (e.g., so that a computer system 10 in the same building as the requester responds to the server command instead of a computer system in another country).

In some embodiments, an application server 235 may include a remote patch server. For example, a remote patch server may be dedicated to provide patches to a customer (e.g., a patch tar bundle of a new version of an explorer) or to another application (e.g., a patch tar bundle of a new version of customer configuration server 100). In one embodiment, the remote patch application server 235 may be sent a file output name, email address(es) of user(s) which should receive the patch bundle, and a list of which patches to include in the patch bundle. The remote patch server may respond by sending a size of the patch bundle to the requesting user and emailing the patch to the specified addresses.

The tools interface 240 may provide an interface to one or more software tools that are external to the customer configuration server 100. For example, the software tools may include third-party tools or tools that are accessed by other applications in addition to customer configuration server 100. In response to receiving a request (e.g., a server command received via input interface 245) specifying a particular tool and/or a particular portion of system configuration data 140 on which that tool should operation, application server 235 may call that tool and provide information identifying which data to operate on (e.g., by accessing an index used in maintaining the organizational hierarchy 200) to the tool via tools interface 240. Customer configuration server 100 may be configured to automatically save each tool's output as a report 144 within system configuration data 140.

Various types of tools may be accessible to customer configuration server 100. One tool may be configured to perform a diagnostic review and evaluation of all or part of a system configuration data 140 for a particular computer system configuration in order to provide reliability and availability information about that computer system. For example, a MAL (Minimum Accepted Level) tool may operate on a explorer data set (or a FRU information set) for a particular computer system 101 to generate a report listing all components included in that computer systems whose revisions are beneath a minimum accepted revision for that type of component. Another tool may operate on two different explorer data sets to determine what components have been upgraded, removed, and/or added during a particular time period. For example, if explorer data sets are received monthly, such a tool may allow service personnel to determine what changes, if any, were made to that computer system's configuration within a particular month by comparing the explorer data set sent for the previous month with the explorer data set for the current month.

As mentioned above, each tool may have various controls and options. Some of these controls and/or options may be unique to a particular tool. Some tools may have controls and options such as emailing output, showing specific report headers, enabling/disabling various features, etc. Input interface 245 may facilitate display of these options to service personnel (e.g., as HTML radio buttons, checkboxes, or text entry fields) and receive information indicating which options are selected.

In some embodiments, customer configuration server 100 may operate in a distributed system. In such an embodiment, several instances of customer configuration server 100 may be executing. Some customer configuration servers 100 may be executing on the same computer system. Other customer configuration servers 100 may execute on different computer systems. Each customer configuration server 100 may control access to system configuration data 140 included in a particular grouping within the hierarchy. For example, each customer configuration server 100 may manage system configuration data 140 logically grouped within a particular country within the hierarchy (i.e., one customer configuration server 100 may manage system configuration data grouped within the United States logical grouping, and another customer configuration server may manage system configuration data grouped within the Australia logical grouping). In some embodiments, each customer configuration server 100 may maintain an index identifying which customer configuration server controls access to each logical grouping of the system configuration data at a particular level of the hierarchy, allowing each customer configuration server to forward requests targeting portions of the system configuration data 140 not managed by that customer configuration server to the appropriate customer configuration server.

Figure 6:
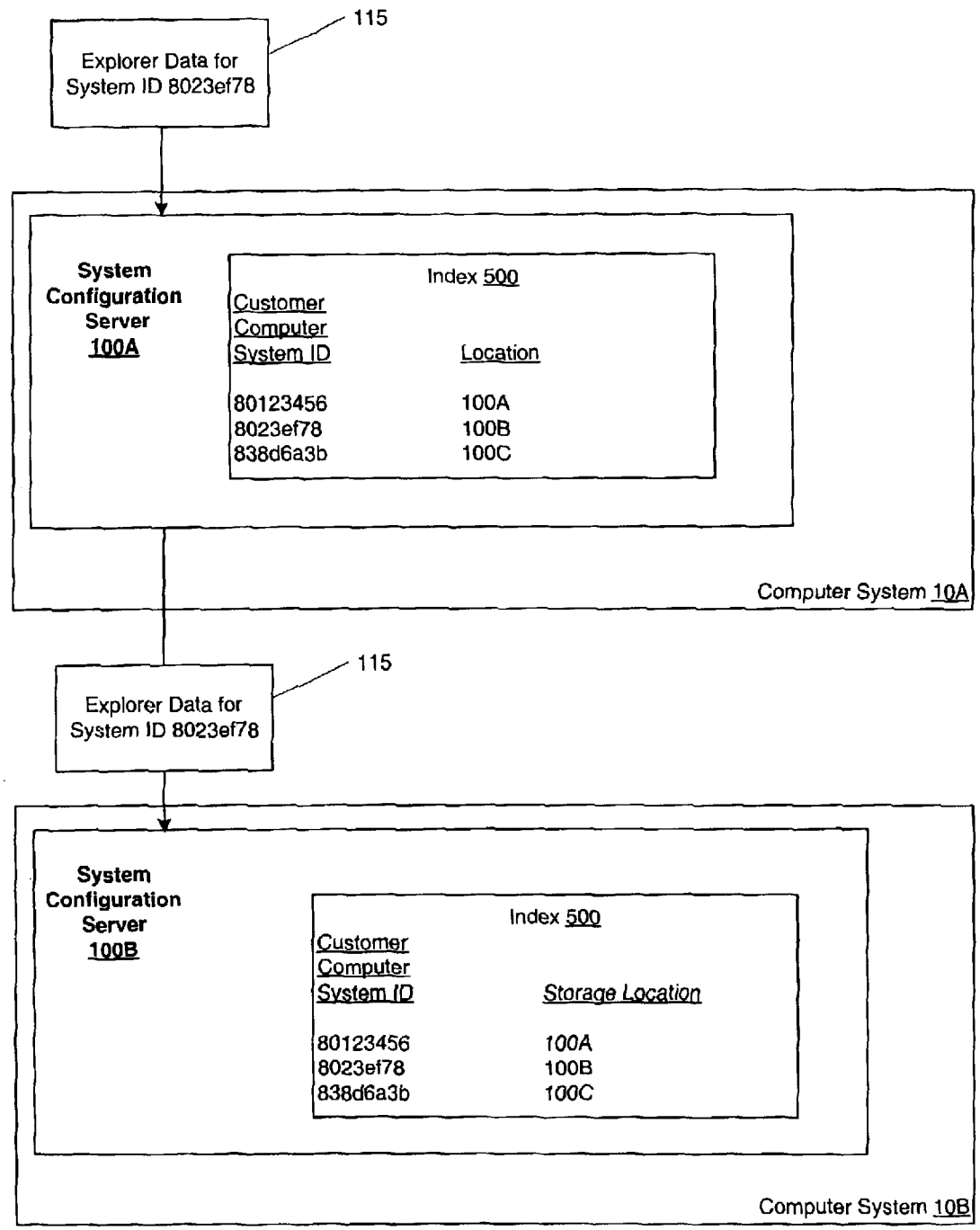
FIG. 6 illustrates a customer configuration server operating in a distributed system that may transfer explorer data to another customer configuration server, according to one embodiment.

FIG. 6 illustrates how system configuration data may be transferred between customer configuration servers 100 operating in a distributed system. Here, two customer configuration servers 100A and 100B are executing. Explorer data 115 may be provided to the customer configuration server 100A by a customer computer system 101. In response to receiving the explorer data, customer configuration server 100A may access an index 500. The index may identify which customer configuration server 100 controls access to each logical grouping of system configuration data at a particular level of the hierarchy. For example, in the illustrated embodiment, the index 500 may identify which customer configuration server 100 controls access to each computer system 101's logical grouping within the hierarchy. If customer configuration server 100A does not control access to the portion of the hierarchy in which customer computer system 101 is grouped, customer configuration server 100A may transfer the explorer data 115 to another customer configuration server 100B that does control access to that portion of the hierarchy.

Any time a customer configuration server 100 updates its index 500, it may also forward a server command to any other customer configuration server, causing the other customer configuration server to update its index. This way, each customer configuration server 100 has the same index.

In the illustrated embodiment, the customer computer system 101 to which explorer data 115 corresponds may be uniquely identified by a system identifier (8023ef78 in FIG. 6) included in explorer data 115. For example, explorer data 115 may be a file identified by a unique file name. The unique file name may include the system identifier. In the illustrated embodiment, index 500 may include the system identifiers of each computer system 101 for which system configuration data 140 exists as well as an indication as to which that computer system's configuration data is stored (e.g., by indicating which customer configuration server 100 manages that portion of the system configuration data 140).

The customer configuration server 100A may be configured to determine whether the system ID for each explorer data set 115 is currently included in the index 500. If the system ID is included in the index 500, the customer configuration server 100A may determine which customer configuration server 100 is storing the system configuration data 140 for that computer system 101. In this example, the index 500 indicates that customer configuration server 100B is storing the system configuration data 140 for that customer computer system, so customer configuration server 100A may transfer the explorer data to customer configuration server 100B. When customer configuration server 100B receives the explorer data 115, it may access index 500 and, upon determining that it is the appropriate customer configuration server to handle the data, store explorer data 115.

If the customer configuration server 100A does not locate the system identifier in the system index 500, then explorer data 115 may be organized as being part of an "orphanage" portion of the hierarchy instead of being organized as part of a particular computer system within the hierarchy. Alternatively, customer configuration server 100A may organize the information within the hierarchy if enough information is available about the system (e.g., the geographical location and customer information for that system), add the system ID included in explorer data 115 to index 500, and store explorer data 115. If explorer data 115 is organized in an orphanage portion of the hierarchy, a service person may manually add the system ID for that explorer data to the index 500, move explorer data 115 from the orphanage location to an associated storage location (e.g., by updating index 500 to include a reference to explorer data 115), and manually organize that computer system within the hierarchy (e.g., by creating a new directory within a directory tree). Once the system identifier is organized within the hierarchy, index 500 may be updated appropriately to include the system identifier and to indicate which portion of the hierarchy includes (and thus which customer configuration server controls access to) that computer system. Subsequently-received data corresponding to that system may be automatically forwarded to the appropriate customer configuration server and organized within the hierarchy.

Figure 7:
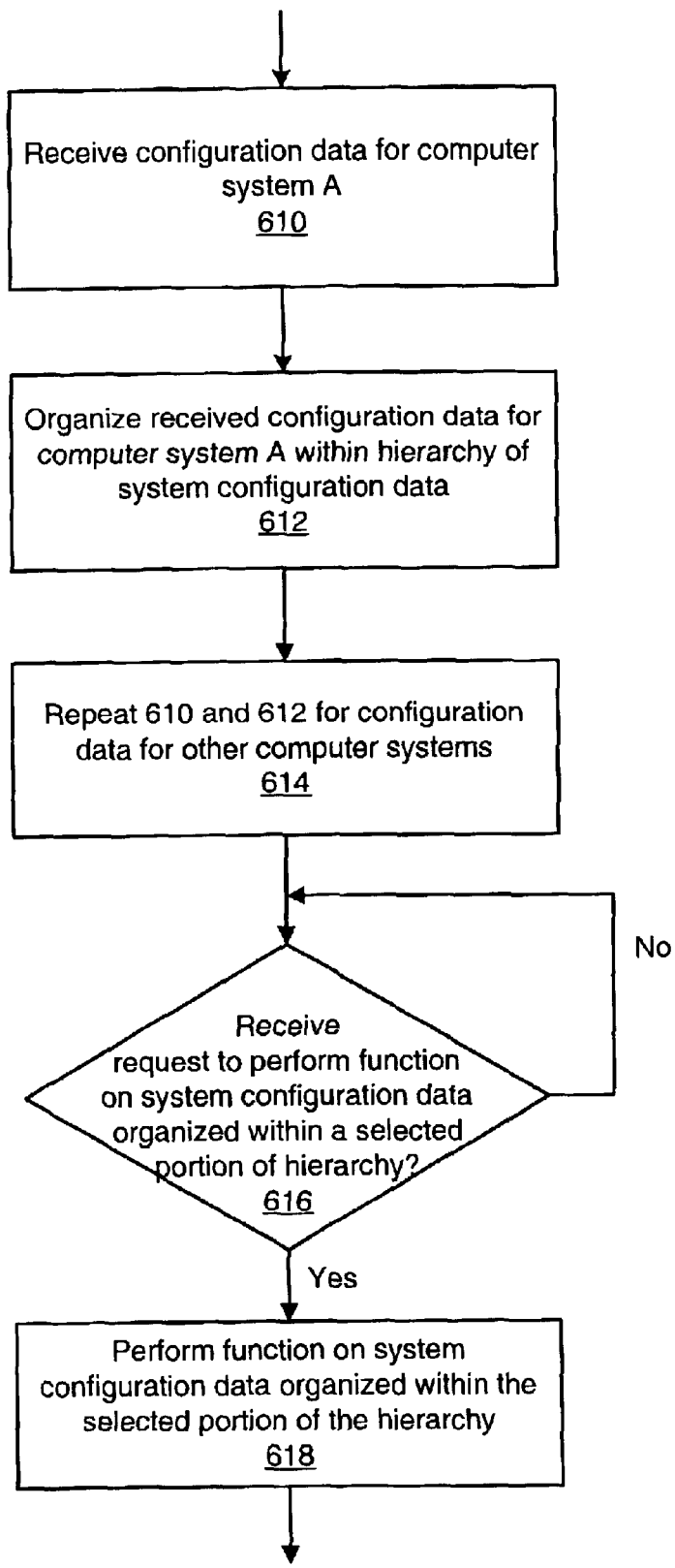
FIG. 7 is a flowchart representing one embodiment of a method for organizing and accessing system configuration data for multiple computer systems.

FIG. 7 illustrates one embodiment of a method of updating and accessing system configuration data for multiple computer systems. At 610, configuration data corresponding to a particular computer system, computer system A, is received. Such configuration data may include explorer data identifying which components are currently included in that computer system, contact data identifying a customer contact associated with that computer system, FRU data identifying FRUs included in that computer system and/or the service history of FRUs included in that computer system, digital images of the computer system, etc. The configuration data may be received via email or various transfer protocols (e.g., HTTP) or received in response to a database query. In one embodiment, the configuration data may be an explorer data set generated by an explorer executing on a computer system.

In response to receiving the data associated with computer system A, the data is organized within a hierarchy of system configuration data, as shown at 612. The hierarchy organizes data associated with multiple computer systems. The hierarchy may logically group data associated with individual computer systems so that all of the information currently available for a particular computer system can be readily identified. The hierarchy may also logically group computer systems (e.g., by customer, industry, location, etc.), facilitating manageable access to and/or management of the system configuration data. Organizing the received data within the hierarchy may include adding a reference to the data in an index and/or a directory tree and physically storing the data within a physical storage location identified by the reference.

At 614, actions 610 and 612 may be repeated for configuration data associated with one or more other computer systems. These functions may be similarly repeated for other computer systems. Additionally, if additional configuration data is later received for computer system A, actions 610 and 612 may be similarly repeated.

In response to a request received at 616, a function may be performed on system configuration data organized within a selected portion of the hierarchy, as shown at 618. The request may specify a tool or process to perform on a particular set of the system configuration data via reference to the hierarchy. For example, the request may indicate that a particular type of data include within each a particular customer's computer systems be processed. By organizing the data for multiple computer systems within the hierarchy, the same tools or processes used to perform particular functions may be easily applied to each computer system's configuration data.

Note that actions 610–612 and 616–618 may be performed at substantially the same time (e.g., data may be organized within the hierarchy during the same time as other data in another portion of the hierarchy is being processed). Also note that additional data for a particular system may be received after similar data corresponding to that system has been processed (e.g., updated versions of explorer data may be received periodically for a particular system, and each set)

Figure 8:
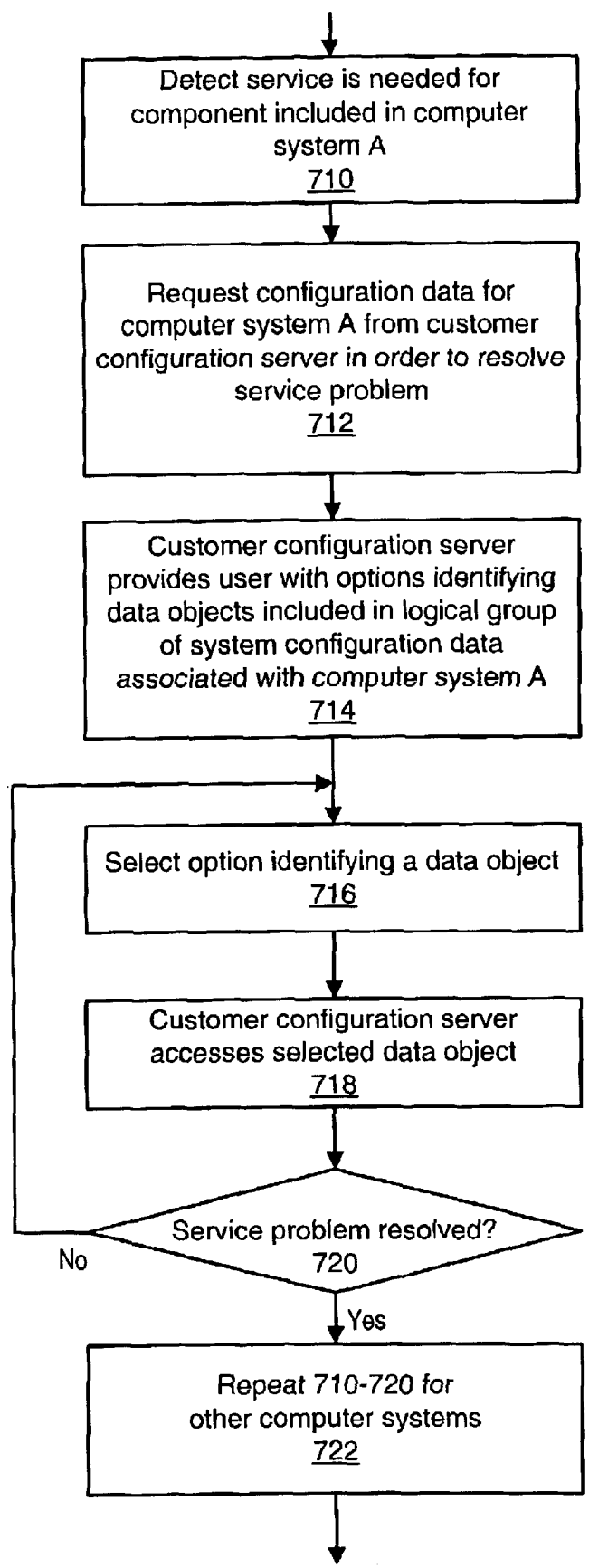
FIG. 8 is a flowchart of one embodiment of a method of resolving a service problem.

FIG. 8 shows one embodiment of accessing system configuration data for multiple computer systems in order to service a component included in a particular one of those computer systems. At 710, the need for service in computer system A is detected. Action 710 may be performed in various ways, including receiving a client email or phone call requesting service; analyzing a report included in the system configuration data for computer system A that indicates an irregularity; analyzing a report generated for multiple computer systems indicating that a component; which is included in computer system A, should be recalled or upgraded, etc.

In order to resolve the service problem, the configuration data for computer system A may be requested from a customer configuration server that organizes system configuration data for multiple computer systems according to a hierarchy of logical groups. The system configuration data for computer system A may be requested in various ways. For example, in one embodiment, a service person may view several options identifying various computer systems owned by a particular customer via a web browser. System configuration data corresponding to computer system A may be requested by selecting the option identifying computer system A. In another embodiment, a service person may request computer system A's configuration data by entering the system ID of computer system A as a search term.

In response to the request for configuration data for computer system A, the customer configuration server may provide the service person with options identifying data objects included in computer system A's logical group of system configuration data, as shown at 714. The data objects identified by each option may be available from various data sources accessible to the customer configuration server. The customer configuration server may provide the options to the service person by displaying the options in a web browser. For example, the customer configuration server may provide options identifying explorer data sets available for computer system A for display on the service person's web browser. Some options may identify a group of data objects. For example, a report option may identify to a group of report objects. Selection of the report option may cause options corresponding to each individual report object to be displayed. The customer configuration server may also provide additional options corresponding to various functions and/or tools that may be applied to certain data objects and/or groups of data objects.

One of the options identifying a particular data object may be selected, and the customer configuration server may access the selected data object from its data source (e.g., by retrieving the data object from a directory or by querying a database), as shown at 718. If the option was selected in conjunction with a non-data object option identifying a function, the customer configuration server may perform the selected function on the selected data object. The customer configuration server may provide the data object to the service person (e.g., by displaying the data object on a web browser or by emailing the data object to the service person) in many embodiments. If a function was selected to be performed on the selected data object, the customer configuration server may provide the result of the function (e.g., a report data object) to the service person.

The service person may review the data object in order to evaluate the service problem identified at 710. For example, the service person may have selected the most recently created explorer data set (at 716) in order to view the current configuration of computer system A. Alternatively, the service person may have selected a service history object corresponding to a particular component (e.g., in order to determine whether a malfunctioning component has experienced similar problems before). Reviewing the data object may allow the service person to resolve the service problem. For example, a data object that identifies the specific part numbers of malfunctioning components may provide the service person with information needed to order replacement parts. A report object identifying which components are below a minimum acceptable level may allow the service person to identify an out-of-date component as a possible cause of the service problem and/or allow the service person to perform preventative maintenance. If the selected data object and/or function does not help resolve the problem, additional data objects may be selected, as shown at 720. The service person may also update one or more data objects in response to resolving the service problem (not shown). For example, the service person may update a component's service history if a component was serviced or update a FRU list if a FRU was replaced.

Since system configuration data for multiple computer systems may be managed by the customer configuration server, functions 710–720 may be repeated for one or more other computer systems, as indicated at 722.

Note that a customer configuration server 100 may be implemented as a single application, multiple applications, a software package, a software suite, one or more software modules, one or more software mechanisms, one or more software routines, other sets of programming instructions executable by a computer system, or a combination thereof. Customer configuration server 100 may be implemented in a variety of ways, using a variety of programming languages, including procedure-based techniques, component-based techniques, and/or object-oriented techniques, among others. For example, the customer configuration server 100 may be implemented with open source code and languages (e.g., openssh and openssl) that run on multiple operating systems. Customer configuration server 100 may operate in a Web server environment. For example, the Web environment may include an Apache Web server, Perl CGI scripts and a suitable Web browser.

Note that customer configuration server 100 may be configured to provide various users with access to system configuration data 140. Such users may include service personnel, customers, etc. Customer configuration server 100 may support various login and/or authentication procedures in order to restrict unidentified users' access to system configuration data 140.

Count Down Monitor

Figure 9:
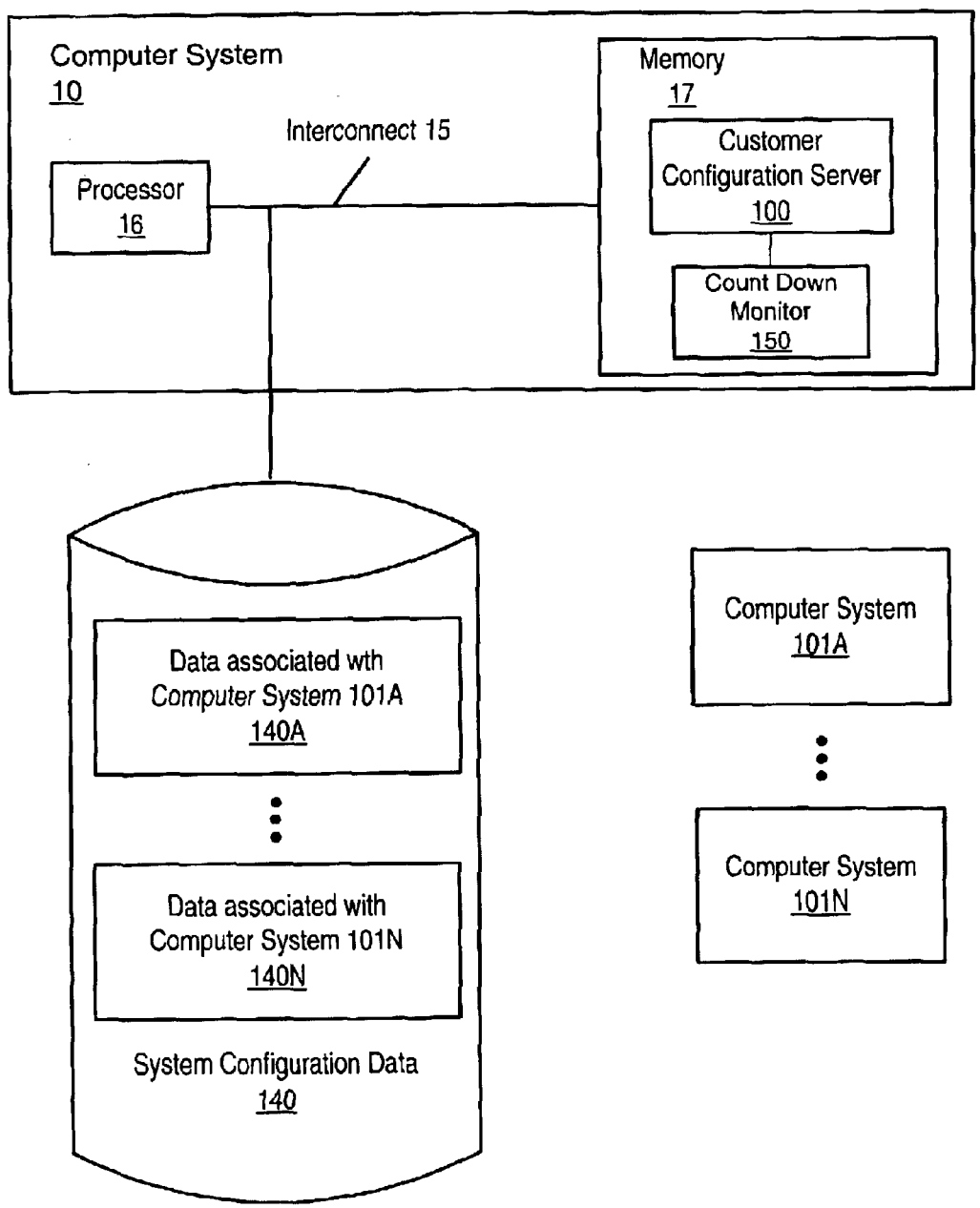
FIG. 9 illustrates one embodiment of a count down monitor configured to alert users that limited lifetime components included in multiple computer systems are due for replacement.

A system and method for automatically determining whether one or more components within multiple computer systems are due for replacement may interact and/or be included in a system that provides up-to-date system configuration data for the multiple computer systems to service personnel, such as a customer configuration server described above. FIG. 9 illustrates one embodiment of a count down monitor 150 that may be configured to automatically alert users (e.g., service personnel) that one or more components included in the multiple computer systems are due for replacement. In one embodiment, the count down monitor 150 may be implemented in a customer configuration server 100 system. In other embodiments, the count down monitor 150 may interact with a different system that provides up-to-date system configuration data for multiple computer systems to users. Thus, the customer configuration server 100 is an exemplary system that includes and/or interacts with one embodiment of a count down monitor 150.

The components monitored by the count down monitor 150 may be limited lifetime components such as air filters, batteries or other components that tend to stop operating correctly after a period of time (e.g., performance of the component may degrade over time). If a limited lifetime component becomes past due for replacement, the past due component may cause other components relying on the past due component to fail. Replacement intervals for replacing the limited lifetime components may vary depending on the type of component, component manufacturer, the environment in which the component is used, etc. Suppliers of various types of components typically specify a recommended replacement interval for limited lifetime components. For example, a recommended replacement interval may be specified as "every six months" or "four times per year".

A system that communicates with one embodiment of a count down monitor may include different types of information about the hardware and software components included in each of the multiple computer systems. For example, system configuration data 140 of a customer configuration server 100 may include information for limited lifetime components such as air filters and batteries. The information may identify each limited lifetime component within each system (e.g., by part number, revision, location in which that component is installed). The information for each limited lifetime component may also include a recommended replacement interval and installation date (e.g., a timestamp). In other embodiments, the limited lifetime component information may be stored and maintained by the count down monitor 150.

The information for limited lifetime components may be accessed in order to determine if one or more limited lifetime components are due for replacement. In one embodiment, the count down monitor 150 may request the information from an application. For example, the limited lifetime component information may be requested from an application such as a customer configuration server 100. The information may be in the explorer data, FRU (field replaceable unit) data, miscellaneous data, or some other data of the customer configuration server 100. In one embodiment, the count down monitor 150 may be configured to request the limited lifetime component information via an input interface and/or application server, for example. In response to the request, the limited lifetime component information may be returned to the count down monitor 150 (e.g., via the input interface).

In one embodiment, the count down monitor 150 may be configured to repeatedly access the limited lifetime component information to provide real time monitoring for past due replacements. In one embodiment, the count down monitor 150 may send a request to obtain the information according to a specified schedule. For example, in one embodiment, the count down monitor may be configured to access the information at different intervals as specified by an internal timer. A custom subclass of a Timer class, for example, may be configured to schedule a specified task (e.g., request limited lifetime information) for repeated fixed-rate execution (e.g., once a day at midnight for batch processing, continuous request every 30 seconds). The specified task may include a request for limited lifetime component information for each component or for multiple components. In another embodiment, a daemon of an operating system may specify a schedule for initiating the request and returning the information to the count down monitor 150. Real time access to the limited lifetime component information may be implemented in various ways. For example, depending on location of the information, the count down monitor 150 may be configured to simply read data that includes the limited lifetime component information.

The limited lifetime component information may identify a recommended replacement interval specified by a supplier for each limited lifetime component. The recommended replacement interval may be used by the count down monitor 150 to determine a count down interval for the component. The count down interval may indicate how often the limited lifetime component should be replaced. The count down interval may be defined in various ways. For example, the count down interval for a limited lifetime component may default to the recommended replacement interval specified by the supplier.

One embodiment of the count down monitor 150 may be configured to include a graphical and/or command line user interface and service personnel, for example, may enter a count down interval via the user interface during initial setup of a computer. The service personnel may decide to set a different count down interval during initial setup than recommended by the supplier because of known environmental conditions or experience with a given component (e.g., past maintenance history indicates a higher frequency of replacement for a particular type of air filter). The count down interval may be modified via the user interface, for example, by service personnel when the limited lifetime component is replaced. For example, the service personnel may choose to use the recommended replacement interval as a default count down interval or may choose to set a different interval during replacement of the component.

One embodiment of the count down monitor 150 may be configured to display a choice (e.g., via the user interface) for specifying a format for the count down interval. For example, the count down interval may be specified as months, days or specific dates (e.g., a 90 day interval, a 3 month interval, once in January and once in July of current year, first quarter of current year). In one embodiment, the count down interval may default to a particular format if the recommended replacement interval, for example, is used to automatically set the count down interval. The count down monitor 150 may be configured to store and/or manipulate many formats and variations of a count down interval.

The count down monitor 150 may be configured to access the count down interval of each limited lifetime component and the installation date (e.g., a timestamp) of the limited lifetime component to determine if the count down interval has elapsed. For example, the count down monitor 150 may be configured to determine if a count down interval has elapsed by comparing the sum of the count down interval and the installation date to the current date. If the sum is greater than the current date, then the count down monitor may determine that the count down interval for that limited lifetime component has elapsed. In one embodiment, the count down monitor may be configured to determine if a count down interval has elapsed by manipulating the count down interval to match the installation date format (e.g., a "once every quarter" count down interval may be manipulated to identify an exact expiration date by adding 90 days to the installation date) and then comparing the manipulated count down interval to the installation date. Other embodiments of a count down monitor 150 may be configured in other ways to determine if a count down interval has elapsed.

The count down monitor 150 may be configured to automatically generate an alert that one or more count down intervals have elapsed. One embodiment of a count down monitor 150 may be configured as an event listener. The count down monitor 150 may be configured to determine an event (e.g., a count down interval has expired) has occurred and generate an alert in response to the event. For example, every time a count down interval expires (e.g., determined from the count down interval and the installation date), the count down monitor may generate an alert. In one embodiment, after an event has occurred, the count down monitor 150 may be configured to notify an application that the event has occurred. For example, in response to determining that a limited lifetime component is due for replacement, the count down monitor 150 may be configured to forward a generated alert to the application (e.g., customer configuration server 100).

In some embodiments, the alert may be visual and/or audio. The count down monitor may be configured to generate the type of alert based on a specified interactive and/or silent mode, for example. In one embodiment, a type of alert may be specified by a user via the user interface. For example, a user may indicate to the count down monitor 150 (e.g., select a choice via the user interface) to broadcast an audio alert when interactive mode is set if one or more limited lifetime components are due for replacement.

In one embodiment, icons of components with elapsed count down intervals may be highlighted in red on the user interface to visually alert users that those highlighted components are due for replacement. In other embodiments, the count down monitor 150 may be configured to send an email notification to one or more users that components are due for replacement. A page and/or voice mail may be sent to users based on a distribution list accessible to one embodiment of a count down monitor 150. The count down monitor 150 may be configured to perform various types of alerts. For example, icons of components may be highlighted with blinking text on the user interface and a sound broadcast over workstation speakers to alert users that those highlighted components are due for replacement.

In some embodiments, the alert may be generated by automatically creating a service call in a call management system used by the service personnel. Each service call may be assigned a priority within the call management system (e.g., to allow service personnel to determine the order in which calls should be handled). The count down monitor may accordingly set the service call corresponding to the limited lifetime component at a specific priority. Typically, service calls generated by the count down monitor may have lower priorities than critical calls (e.g., calls generated due to actual component failures). In one embodiment, the count down monitor may also increase the priority of a service call generated due to a limited lifetime component's countdown interval elapsing if a certain amount of time (e.g., a week or a month) passes without replacement of that component.

A service person may have received an alert from one of various devices (e.g., via a pager). In one embodiment, the count down monitor may be configured to enable the service person to "drill down" or search for a particular computer system to identify which computer system has a limited lifetime component that needs replacing. For example, the service person may use the count down monitor to identify computer systems located within their geographical region (e.g., according to a hierarchy of logical groups within system configuration data 140) and icons of particular computer systems with elapsed count down intervals within that geographical region may be highlighted. In other embodiments, the count down monitor may have sent alerts to a system (e.g., customer configuration server 100) and that system may highlight the computer systems within the geographical region. The count down monitor 150 may enable the service person to immediately know if components included in multiple computer systems are due for replacement. Service staff may be quickly assigned by the service person to perform one or more of the replacements. Likewise, due to real time monitoring of limited lifetime components within multiple systems, the service staff may have begun performing the one or more replacements before a service person (e.g., service staff manager) was aware replacements were needed.

One embodiment of a count down monitor 150 may be configured to repeatedly generate the alert for a component with an elapsed count down interval until a user indicates the component has been replaced. For example, the count down monitor 150 may be configured to display a visual alert until a user enters a parts order number (e.g., via the user interface) associated with the replacement component. One embodiment of a count down monitor 150 may be configured to generate the alert until other types of information are entered (e.g., service technician signs name). The count down monitor may receive the information (e.g., parts order number, service technician name) and verify if the information is acceptable. For example, one embodiment of the count down monitor may be configured to access a database to verify the information is valid (e.g., cross check if the part order number is correct for that configuration).

In one embodiment, the count down monitor 150 may be configured to enable a user to request that the alert be turned off for a limited period of time (e.g., three days). For example, the count down monitor 150 may be configured to stop generating the alert for the limited period of time while waiting for notification (e.g., receiving a part order number) that the component has been replaced. The count down monitor 150 may be configured to enable a user to assign the limited period of time. For example, a user may enter via the user interface three days as the limited period of time and the count down monitor may stop generating the alert for three days.

The count down monitor 150 may be configured to automatically reset the count down interval associated with a component after the notification of replacement is received. For example, the count down monitor 150 may immediately reset the count down interval to the default recommended replacement interval for the component. In one embodiment, the count down monitor 150 may be configured to enable a user to reset the count down interval to a different interval (e.g., different interval for a different type of component).

Figure 10:
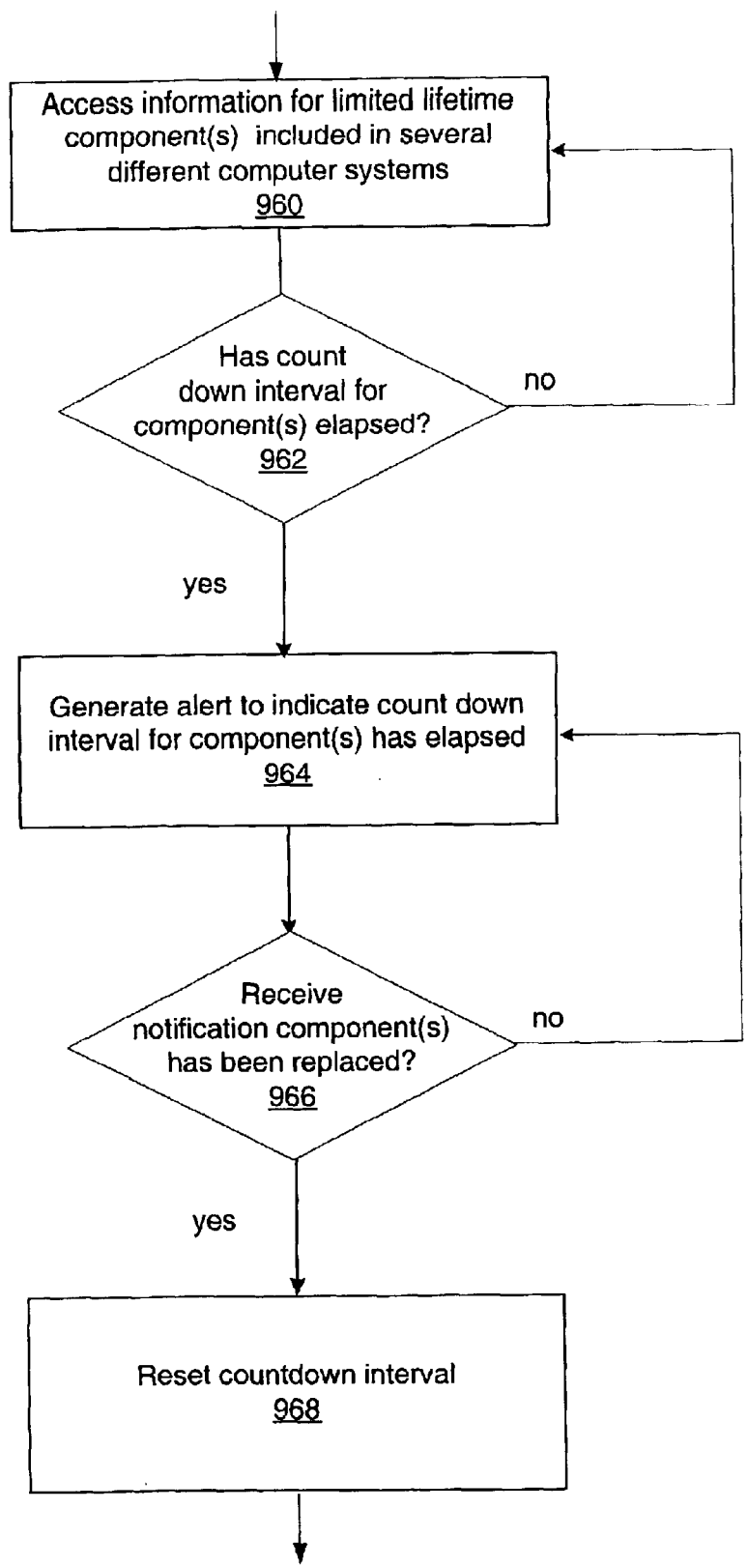
FIG. 10 is a flowchart of one embodiment of a method for alerting users that limited lifetime components included in multiple computer systems are due for replacement.

FIG. 10 is a flowchart of one embodiment of a method for automatically alerting users that one or more limited lifetime components included in multiple computer systems are due for replacement. The limited lifetime components may be components that tend to stop operating correctly after a period of time. For example, the performance of air filters and batteries may degrade over time. A system such as a customer configuration server may include information for limited lifetime components that identifies each limited lifetime component within each system (e.g., by a part number, a revision, a location in which that component is installed). In other embodiments, the limited lifetime component information may be stored and maintained by a system other than a customer configuration server. The information for each limited lifetime component may also include a recommended replacement interval and installation date (e.g., timestamp).

The information for limited lifetime components may be accessed, as indicated in 960, in order to determine if one or more limited lifetime components are due for replacement. In one embodiment, the information may be requested from a system such as a customer configuration server. The limited lifetime component information may be repeatedly accessed to provide real time monitoring for past due replacements. In one embodiment, an internal timer may initiate a request for limited lifetime component information at different intervals. Real time access to the limited lifetime component information may be implemented in various ways. For example, depending on location of the information, data that includes the limited lifetime component information may be sent to and received by the count down monitor according to a specified schedule that is managed by another application.

The limited lifetime component information may identify a recommended replacement interval specified by a supplier for each limited lifetime component. The recommended replacement interval may be used to determine a count down interval for the component. Many formats and variations of a count down interval may be stored and/or manipulated. The count down interval and the installation date (e.g., a timestamp) of each limited lifetime component may be accessed to determine if the count down interval has elapsed, as indicated in 962. In one embodiment, a database table may store a conversion procedure name and a count down interval format associated with the conversion procedure, and the procedure name and format may be used to determine if a count down interval for that type of count down interval format has elapsed. Various embodiments may use various approaches to determine if a count down interval has elapsed.

An alert may be automatically generated to indicate that one or more count down intervals have elapsed, as indicated in 964. For example, every time a count down interval expires, the count down monitor may generate an alert. The alert may be a call to a phone and/or a message via a fax, a device, an email or some other type of alert. An application may be configured to receive generated alerts and to display highlighted icons of components due for replacement. For example, a system such as a customer configuration server may store system configuration data for multiple computer systems and the system may display highlighted icons (e.g., via a Web browser) of limited lifetime components within the multiple systems that are due for replacement. The system configuration data may be stored according to a hierarchy of logical groups and may include multiple computer systems within a geographical region as a logical group. A user may view a user interface (e.g., via the Web browser) and see a generated visual alert (e.g., a highlighted icon of a geographical region with components due for replacement). The user may then "drill down" (e.g., browse Web pages that display system information for each system in that geographical region) to identify a particular system within the geographical region.

The alert may be generated for a component with an elapsed count down interval until a notification is received that indicates the component has been replaced, as indicated in 966. For example, a visual alert may be displayed until a user enters a part order number associated with a replacement component (e.g., a notification that the component has been replaced may have been generated when the part number was entered via an user interface). In some embodiments, a notification that the component has been replaced may be received although the count down interval for the component has not expired. For example, a limited lifetime component may be replaced for another reason (e.g., failure) and a notification that the component has been replaced may be received.

The count down interval associated with a component may be reset after the notification of replacement is received, as indicated in 968. For example, the count down interval may be immediately reset to the default recommended replacement interval for the component. In one embodiment, the count down interval may be reset to a different interval (e.g., different interval for a different type of component) by a user via the user interface.

The flow charts described herein represent exemplary embodiments of methods. The methods may be implemented in software, hardware, or a combination thereof. The order of method may be changed, and various elements may be added, reordered, combined, omitted, modified, etc.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

Various embodiments may further include receiving, sending or storing instructions and/or data implemented in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

What is claimed is:

1. A system, comprising:
    a processor; and
    a memory coupled to the processor and configured to store program instructions executable by the processor to implement a count down monitor, wherein the count down monitor is configured to:
        access system configuration data for each computer system of a plurality of computer systems, wherein limited lifetime information for one or more limited lifetime components included in each computer system of the plurality of computer systems is included in the system configuration data; and
        automatically generate an alert to indicate that one or more limited lifetime components in the plurality of computer systems are due for replacement dependent on the limited lifetime information for each limited lifetime component.

2. The system of claim 1, wherein the count down monitor is configured to determine that a component of the plurality of limited lifetime components is due for replacement by accessing a count down interval and an installation date timestamp of the component to identify if the count down interval has elapsed.

3. The system of claim 1, wherein the count down monitor is configured to initiate a request for the limited lifetime information at different intervals as indicated by an internal timer, wherein the internal timer specifies the different intervals.

4. The system of claim 3, wherein the request for the limited lifetime information is sent to a customer configuration server system that includes the system configuration data.

5. The system of claim 4, wherein the system configuration data is organized within a hierarchy of logical groups.

6. The system of claim 1, wherein the count down monitor is configured to stop generating the alert for a limited period of time while waiting for notification that the one or more of the components have been replaced.

7. The system of claim 6, wherein the notification comprises a part order number associated with a replacement component for each of the one or more limited lifetime components.

8. The system of claim 1, wherein the alert is a visual alert.

9. The system of claim 8, wherein the visual alert for the one or more limited lifetime components is generated by highlighting an icon of the one or more limited lifetime components in red.

10. The system of claim 1, wherein the alert is an audio alert that is broadcast over a speaker, wherein the audio alert is a beeping sound.

11. The system of claim 1, wherein the one or more limited lifetime components comprise at least one of an air filter and a battery.

12. The system of claim 1, wherein the count down monitor is configured to generate the alert by creating a service call identifying the one or more limited lifetime components in a service call management system.

13. A method, comprising:
    accessing system configuration data for each computer system of a plurality of computer systems, wherein limited lifetime information for one or more limited lifetime components included in each computer system of the plurality of computer systems is included in the system configuration data; and
    depending on the limited lifetime information for each of the one or more limited lifetime components, automatically generating an alert for each of the one or more limited lifetime components that are due for replacement;
    wherein said accessing further comprises accessing the limited lifetime information from a customer configuration server system that includes the system configuration data.

14. The method of claim 13, wherein said automatically generating further comprises determining that a component of the plurality of limited lifetime components is due for replacement by accessing a count down interval and an installation date timestamp of the component to identify if the count down interval has elapsed.

15. The method of claim 13, wherein said accessing further comprises accessing the limited lifetime information at different intervals.

16. The method of claim 13, further comprising stopping the generation of the alert for a limited period of time while waiting for notification that the one or more limited lifetime components have been replaced.

17. The method of claim 16, wherein said waiting comprises waiting for a user to enter a part order number associated with a replacement component for each of the one or more limited lifetime components whose count down interval has elapsed.

18. The method of claim 13, wherein the alert is a visual alert.

19. The method of claim 18, wherein the visual alert for the one or more limited lifetime components is indicated by highlighting an icon of the one or more limited lifetime components in red.

20. The method of claim 13, wherein the alert is an audio alert that is broadcast over a speaker, wherein the audio alert is a beeping sound.

21. The method of claim 13, wherein the one or more limited lifetime components comprise at least one of an air filter and a battery.

22. The method of claim 13, wherein the system configuration data is organized within a hierarchy of logical groups.

23. The method of claim 13, wherein said generating the alert for each of the one or more limited lifetime components that are due for replacement comprises creating a service call entry corresponding to each of the one or more limited lifetime components that are due for replacement in a service call management system.

24. A computer accessible medium comprising program instructions, wherein the program instructions are computer executable to:
    access, from a customer configuration server system, system configuration data for each computer system of a plurality of computer systems, wherein limited lifetime information for one or more limited lifetime components included in each computer system of the plurality of computer systems is included in the system configuration data; and
    depending on the limited lifetime information for each of the one or more limited lifetime components, automatically generate an alert for each of the one or more limited lifetime components that are due for replacement.

25. The computer accessible medium of claim 24, wherein the program instructions are further executable to determine that a component of the plurality of limited lifetime components is due for replacement by accessing a count down interval and an installation date timestamp of a component to identify if the count down interval has elapsed.

26. The computer accessible medium of claim 24, wherein the program instructions are further executable to access the limited lifetime information at different intervals.

27. The computer accessible medium of claim 25, wherein the program instructions are further executable to stop the generation of the alert for a limited period of time while waiting for notification that the one or more limited lifetime components have been replaced.

28. The computer accessible medium of claim 27, wherein said waiting comprises waiting for a user to enter a part order number associated with a replacement component for each of the one or more limited lifetime components whose count down interval has elapsed.

29. The computer accessible medium of claim 24, wherein the alert is a visual alert.

30. The computer accessible medium of claim 29, wherein the visual alert for the one or more limited lifetime components is indicated by highlighting an icon of the one or more limited lifetime components in red.

31. The computer accessible medium of claim 24, wherein the alert is an audio alert that is broadcast over a speaker, wherein the audio alert is a beeping sound.

32. The computer accessible medium of claim 24, wherein the one or more limited lifetime components comprise at least one of an air filter and a battery.

33. The computer accessible medium of claim 24, wherein the system configuration data is organized within a hierarchy of logical groups.

34. The computer accessible medium of claim 24, wherein the program instructions are executable to generate the alert for each of the one or more limited lifetime components that are due for replacement by creating a service call entry corresponding to each of the one or more limited lifetime components that are due for replacement in a service call management system.

* * * * *

UNITED STATES PATENT AND TRADEMARK OFFICE
CERTIFICATE OF CORRECTION

PATENT NO. : 6,909,992 B2  Page 1 of 1
DATED : June 21, 2005
INVENTOR(S) : Mark Ashley It is certified that error appears in the above-identified patent and that said Letters Patent is hereby corrected as shown below:

Column 26,
Line 6, please delete "the components" and insert -- the limited lifetime components -- in place thereof.

Column 28,
Line 1, please delete "claim 25" and insert -- claim 24 -- in place thereof.

Signed and Sealed this

Fourth Day of October, 2005

JON W. DUDAS
*Director of the United States Patent and Trademark Office*